United States Patent
Tsuchida

(10) Patent No.: US 6,860,807 B2
(45) Date of Patent: Mar. 1, 2005

(54) VIDEO GAME WITH DISTINCTIVE ATTRIBUTES FOR ENEMY CHARACTERS, PREDETERMINED CHARACTERS, AND CANDIDATE CHARACTERS

(75) Inventor: Toshiro Tsuchida, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 188 days.

(21) Appl. No.: 09/964,654

(22) Filed: Sep. 28, 2001

(65) Prior Publication Data

US 2003/0003978 A1 Jan. 2, 2003

(30) Foreign Application Priority Data

Jun. 29, 2001 (JP) .......................................... 2001-199107

(51) Int. Cl.⁷ ................................................ A63F 9/24
(52) U.S. Cl. ............................................ 463/7; 463/30
(58) Field of Search ............................... 463/1, 2, 5, 6, 463/7, 8, 30–34; 345/856–862

(56) References Cited

U.S. PATENT DOCUMENTS 6,210,273 B1    4/2001  Matsuno
6,500,069 B1 * 12/2002  Ohba et al. ................... 463/31

FOREIGN PATENT DOCUMENTS

JP    8-69274    3/1996
JP    2000-84252 3/2000

OTHER PUBLICATIONS

"Age of Rifles, 1846–1905: Strategies for the Hundred Years (Ago) War" by Tom Chick [http://www.cdmag.com/articles/005/073/age_of_rifles_hints_1.html], pps 1–6.*
User Manual, "Age of Rifles 1846–1905". Published by Strategic Simulations, Inc. 1996, pp. 10–12, 16, 28–29 and 72.*
WARCRAFT: Orcs & Humans by Blizzard Entertainment (1995).

* cited by examiner

Primary Examiner—Mark Sager
(74) Attorney, Agent, or Firm—Greenblum & Bernstein, P.L.C.

(57) ABSTRACT

A computer-readable recording medium with a video game program recorded thereon; a video game program; a video game processing method; and a video game processing apparatus, with which it is possible to understand easily which of a number of displayed characters is to be the object of an action of a player character and it is possible to make a player character execute an intended action exactly. The input of an action to be performed by a predetermined character is accepted and the input of a candidate character intended to be an object of the action is accepted, and the display color of a cursor pointing at the candidate character is made to be different when the action accepted as input is an attack action and the candidate character is an enemy character from when the action accepted as input is an attack action and the candidate character is not an enemy character.

12 Claims, 4 Drawing Sheets

VIDEO GAME WITH DISTINCTIVE ATTRIBUTES FOR ENEMY CHARACTERS, PREDETERMINED CHARACTERS, AND CANDIDATE CHARACTERS

CROSS-REFERENCE TO RELATED APPLICATION

The present disclosure relates to subject matter contained in Japanese Patent Application No. 2001-199107, filed on Jun. 29, 2001, the disclosure of which is expressly incorporated herein by reference in its entirety.

BACKGROUND OF THE INVENTION

1. Field of the Invention

The present invention relates to video games. More specifically, the present invention relates to a video game capable of displaying multiple characters including player characters and enemy characters on a screen and controlling actions of the displayed characters in accordance with control operations of a player.

2. Background Information

There has been a genre of computer video games, known as the role-playing games (RPG). In an RPG, generally, a character performs a role in a game in place of a player, and by controlling this character (hereinafter, the player character) the player experiences a virtual adventure while causing a story involving the player character to unfold. In most cases, a character which opposes the player character (hereinafter, an enemy character) is provided in each of a number of set zones formed in a virtual space. The story is then caused to unfold by the player character proceeding from one zone to the next and fighting with and defeating enemy characters seeking to prevent the player character from achieving a certain objective in the story.

The player character is controlled by buttons on a keypad, or a joystick or the like. In response to control operations performed on this keypad, the player character moves and carries out predetermined actions. In the course of the story, numerous events such as battle scenes are provided. In these events, the game proceeds on the basis of selection operations being carried out by the player.

Although in battle scenes of video games of related art in many cases a player character and an enemy character fight one-on-one. Video games have also been proposed which make the game more interesting allowing a number of player characters and a number of enemy characters to fight. The present invention includes a video game with which multiple player characters and multiple enemy characters can fight and, furthermore, it is possible as necessary to replace a player character taking part in a battle.

However, in video games of the related art, there has been the problem that the greater the number of characters taking part in a battle, and the more complicated the actions that the player characters perform, the more difficult it becomes to keep track of their state. Furthermore, in worst cases, sometimes the player performs an erroneous control operation and a character does not carry out the action that the player intended, and the enjoyment of the game is reduced. Because of this, a video game is desired in which it is possible to understand easily which character is to be the object of an action of a player character and it is possible to make a player character execute an intended action exactly.

SUMMARY OF THE INVENTION

It is therefore an object of the present invention to provide a computer-readable recording medium with a video game program recorded thereon; a video game program; a video game processing method; and a video game processing apparatus, with which it is possible to understand easily which character is to be the object of an action of a player character and it is possible to make a player character execute an intended action exactly.

To achieve this object and other objects, a first aspect of the invention provides a computer-readable recording medium on which is recorded a video game program capable of displaying multiple characters including a player character and an enemy character on a screen and controlling actions of the displayed characters in accordance with control operations of a player. The program executes input-accepting that accepts the input to a computer of a candidate character intended to be the object of an action to be performed by a predetermined character in accordance with a control operation of a player. The program determines whether the candidate character accepted as input is an enemy character. In accordance with a determination result, the program displays the vicinity of the candidate character differently depending on whether the candidate character is an enemy character.

According to this first aspect, because the vicinity of the candidate character is displayed differently depending on whether or not the candidate character is an enemy character, it is possible to provide a recording medium including a program with which the player can easily make out the candidate character and the enjoyment of the game can be maintained.

In this first aspect, also, a program for executing displaying a predetermined character vicinity differently from a candidate character vicinity may be recorded on the recording medium. By this, it is possible to provide a recording medium with a program in which the relationships between multiple characters can be understood more exactly and the enjoyment of the game can be maintained.

A second aspect of the invention provides a computer-readable recording medium on which is recorded a video game program capable of displaying multiple characters including a player character and an enemy character on a screen and controlling actions of the displayed characters in accordance with control operations of a player. The program accepts the input to a computer of an action to be performed by a predetermined character in accordance with a control operation of a player. The program also accepts the input to the computer of a candidate character intended to be an object of the action to be performed by the predetermined character in accordance with a control operation of a player. The program additionally in accordance with the type of the action accepted as input and the type of the candidate character accepted as input displays the vicinity of the candidate character differently depending on whether or not the candidate character is an enemy character.

According to this second aspect, because the vicinity of the candidate character is displayed differently depending on the type of the player character action and the type of the candidate character intended to be an object of the action, it is possible to provide a recording medium including a program with which the player can easily make out the candidate character and the enjoyability of the game can be maintained.

In this second aspect, preferably, when the action accepted as input is an attack action and the candidate character is an enemy character, a cursor pointing at the candidate character is displayed in a first display form, and when the action accepted as input is an attack action and the candidate character is not an enemy character, the cursor pointing at the candidate character is displayed in a second display form. By this, the function for distinguishing the candidate character is added to a cursor necessary for character selection, and because, with the help of the display form of the cursor attack action control, operations can be carried out more exactly, it is possible to provide a recording medium including a program with which the enjoyment of the game can be maintained.

And, in this second aspect, preferably, when the action accepted as input is a defense action and the candidate character is not an enemy character, a cursor pointing at the candidate character is displayed in a first display form. When the accepted action input is a defense action and the candidate character is an enemy character, the cursor pointing at the candidate character is displayed in a second display form. By this means, the function for distinguishing the candidate character is added to a cursor necessary for character selection. Because defense action control operations can be carried out more exactly with the help of the display form of the cursor, it is possible to provide a recording medium including a program with which the enjoyment of the game can be maintained.

And, with this second aspect, a program for displaying the vicinity of the predetermined character differently from the vicinity of the candidate character may also be recorded on the recording medium. By this, it is possible to provide a recording medium including a program with which the relationships between multiple characters can be understood more exactly and the enjoyability of the game can be maintained.

A third aspect of the invention provides a video game program capable of displaying multiple characters including a player character and an enemy character on a screen and controlling actions of the displayed characters in accordance with control operations of a player. The program that accepts the input to a computer of a candidate character intended to be an object of an action to be performed by a predetermined character in accordance with a control operation of a player. The program also determines whether or not the candidate character accepted as input is an enemy character. The program also, in accordance with a determination result obtained in the determining step, displays the vicinity of the candidate character differently depending on whether or not the candidate character is an enemy character.

According to this third aspect, because the vicinity of the candidate character is displayed differently depending on whether or not the candidate character is an enemy character, the player can easily make out the candidate character and the enjoyability of the game can be maintained.

With this third aspect, also, the program may display a vicinity of the predetermined character differently from the vicinity of the candidate character. This makes it possible for the relationships between multiple characters to be understood more exactly and for the enjoyability of the game to be maintained.

A fourth aspect of the invention provides a video game program capable of displaying multiple characters including a player character and an enemy character on a screen and controlling actions of the displayed characters in accordance with control operations of a player. The program accepts the input to a computer of an action to be performed by a predetermined character in accordance with a control operation of a player. The program also accepts the input to the computer of a candidate character intended to be the object of the action to be performed by the predetermined character in accordance with a control operation of a player. The program also, in accordance with the type of the action accepted as input and the type of the candidate character accepted as input, displays the vicinity of the candidate character differently depending on whether or not the candidate character is an enemy character.

According to this fourth aspect, because the vicinity of the candidate character is displayed differently depending on the type of the player character action and the type of the candidate character intended to be an object of the action, the player can easily make out the candidate character and the enjoyability of the game can be maintained.

With this fourth aspect, preferably, when the action accepted as input in the first step is an attack action and the candidate character is an enemy character, a cursor pointing at the candidate character is displayed in a first display form in the displaying step. When the action accepted as input in the first step is an attack action and the candidate character is not an enemy character, the cursor pointing at the candidate character is displayed in a second display form in the displaying step. By this means, the function for distinguishing the candidate character is added to a cursor necessary for character selection, and because attack action control operations can be carried out exactly with the help of the display form of the cursor, the enjoyability of the game can be maintained.

With this fourth aspect, preferably, when the action accepted as input in the first step is a defense action and the candidate character is not an enemy character, a cursor pointing at the candidate character is displayed in a first display form in the displaying step. When the action accepted as input in the first step is a defense action and the candidate character is an enemy character, the cursor pointing at the candidate character is displayed in a second display form in the displaying step. By this means, the function for distinguishing the candidate character is added to a cursor necessary for character selection. Because defense action control operations can be carried out more exactly with the help of the display form of the cursor, the enjoyability of the game can be maintained.

With this fourth aspect, also, the program may execute a step of displaying the vicinity of the predetermined character differently from the vicinity of the candidate character. This makes it possible for the relationships between multiple characters to be understood more exactly and for the enjoyability of the game to be maintained.

A fifth aspect of the invention provides a video game processing method of a video game capable of displaying multiple characters including a player character and an enemy character on a screen and controlling actions of the displayed characters in accordance with control operations of a player, the method including an input-accepting that accepts the input to a computer of a candidate character intended to be an object of an action to be performed by a predetermined character in accordance with a control operation of a player. The method also includes a determining that determines whether or not the candidate character accepted as input in the input-accepting is an enemy character. The method additionally includes a displaying that in accordance with a determination result obtained in the determining, displays the vicinity of the candidate character differently depending on whether or not the candidate character is an enemy character.

According to this fifth aspect, because the vicinity of the candidate character is displayed differently depending on whether or not the candidate character is an enemy character, the player can easily make out the candidate character and the enjoyability of the game can be maintained.

With this fifth aspect, the method may further include displaying the vicinity of the predetermined character differently from the vicinity of the candidate character. This makes it possible for the relationships between multiple characters to be understood more exactly and for the enjoyability of the game to be maintained.

A sixth aspect of the invention provides a video game processing method of a video game capable of displaying multiple characters including a player character and an enemy character on a screen and controlling actions of the displayed characters in accordance with control operations of a player, the method includes accepting a first input to a computer of an action to be performed by a predetermined character in accordance with a control operation of a player. The method also includes a accepting a second input to the computer of a candidate character intended to be an object of the action to be performed by the predetermined character in accordance with a control operation of a player. The method also includes a displaying that in accordance with the type of the action accepted as the first input and the type of the candidate character accepted as the second input, displays the vicinity of the candidate character differently depending on whether or not the candidate character is an enemy character.

According to this sixth aspect, because the vicinity of the candidate character is displayed differently depending on the type of the player character action and the type of the candidate character intended to be the object of the action, the player can easily make out the candidate character and the enjoyability of the game can be maintained.

With this sixth aspect, preferably, when the action accepted as the first input is an attack action and the candidate character is an enemy character, a cursor pointing at the candidate character is displayed in a first display form in the displaying. When the action input-accepted in the first input is an attack action and the candidate character is not an enemy character, the cursor pointing at the candidate character is displayed in a second display form in the displaying. By this means the function for distinguishing the candidate character is added to a cursor necessary for character selection. Because attack action control operations can be carried out exactly with the help of the display form of the cursor, the enjoyability of the game can be maintained.

With this sixth aspect, preferably, when the action accepted as the first input is a defense action and the candidate character is not an enemy character, a cursor pointing at the candidate character is displayed in a first display form in the displaying. When the action accepted as the first input is a defense action and the candidate character is an enemy character, the cursor pointing at the candidate character is displayed in a second display form in the displaying. By this means the function for distinguishing the candidate character is added to a cursor necessary for character selection. Because defense action control operations can be carried out more exactly with the help of the display form of the cursor, the enjoyability of the game can be maintained.

And with this sixth aspect, also, the method may be further provided with displaying of the vicinity of the predetermined character differently from the vicinity of the candidate character. This makes it possible for the relationships between multiple characters to be understood more exactly and for the enjoyability of the game to be maintained.

A seventh aspect of the invention provides a video game apparatus, including a storing system that stores a video game program capable of displaying multiple characters including a player character and an enemy character on a screen and controlling actions of the displayed characters in accordance with control operations of a player. The apparatus also includes a computer for reading from the storing system and executing the program. The apparatus also includes a display apparatus for picture display, provided as an output of the computer, wherein the computer, by executing the program, accepts the input of a candidate character intended to be an object of an action to be performed by a predetermined character in accordance with a control operation of a player. The apparatus also determines whether or not the input accepted for the candidate character is for an enemy character. The apparatus also displays the vicinity of the candidate character differently depending on whether or not the candidate character is an enemy character.

According to this seventh aspect, because the vicinity of the candidate character is displayed differently depending on whether or not the candidate character is an enemy character, the player can easily make out the candidate character and the enjoyability of the game can be maintained.

With this seventh aspect, also the computer may display the vicinity of the predetermined character differently from the vicinity of the candidate character. This makes it possible for the relationships between multiple characters to be understood more exactly and for the enjoyability of the game to be maintained.

An eighth aspect of the invention provides a video game apparatus, including a storing system that stores a video game program capable of displaying multiple characters including a player character and an enemy character on a screen and controlling actions of the displayed characters in accordance with control operations of a player. The apparatus also includes a computer for reading from the storing system and executing the program. The apparatus additionally includes a display apparatus for picture display, provided as output system of the computer, wherein the computer, by executing the program, accepts the input of an action to be performed by a player character in accordance with a control operation of a player. The apparatus also accepts the input of a candidate character intended to be an object of the action to be performed by the predetermined character. The apparatus, additionally, in accordance with the type of the action accepted as input and the type of the candidate character accepted as input, displays the vicinity of the candidate character differently depending on whether or not the candidate character is an enemy character.

According to this eighth aspect, because the vicinity of the candidate character is displayed differently depending on the type of the player character action and the type of the candidate character intended to be an object of the action, the player can easily make out the candidate character and the enjoyability of the game can be maintained.

With this eighth aspect, preferably, when the action accepted as input is an attack action and the candidate character is an enemy character, a cursor pointing at the candidate character is displayed in a first display form. When the action input-accepted is an attack action and the candidate character is not an enemy character, the cursor pointing at the candidate character is displayed in a second display form. By this means the function for distinguishing the candidate character is added to a cursor necessary anyway for character selection, and because attack action control operations can be carried out exactly with the help of the display form of the cursor, the enjoyability of the game can be maintained.

And with this eighth aspect, preferably, when the action input-accepted is a defense action and the candidate character is not an enemy character, a cursor pointing at the candidate character is displayed in a first display form. When the action input-accepted is a defense action and the candidate character is an enemy character, the cursor pointing at the candidate character is displayed in a second display form. By this means the function for distinguishing the candidate character is added to a cursor necessary for selecting characters. Because defense action control operations can be carried out more exactly with the help of the display form of the cursor, the enjoyability of the game can be maintained.

And, with this eighth aspect, also, the computer may display the vicinity of the predetermined character differently from the vicinity of the candidate character. This makes it possible for the relationships between multiple characters to be understood more exactly and for the enjoyability of the game to be maintained.

DETAILED DESCRIPTION OF THE PREFERRED EMBODIMENTS

Figure 1:
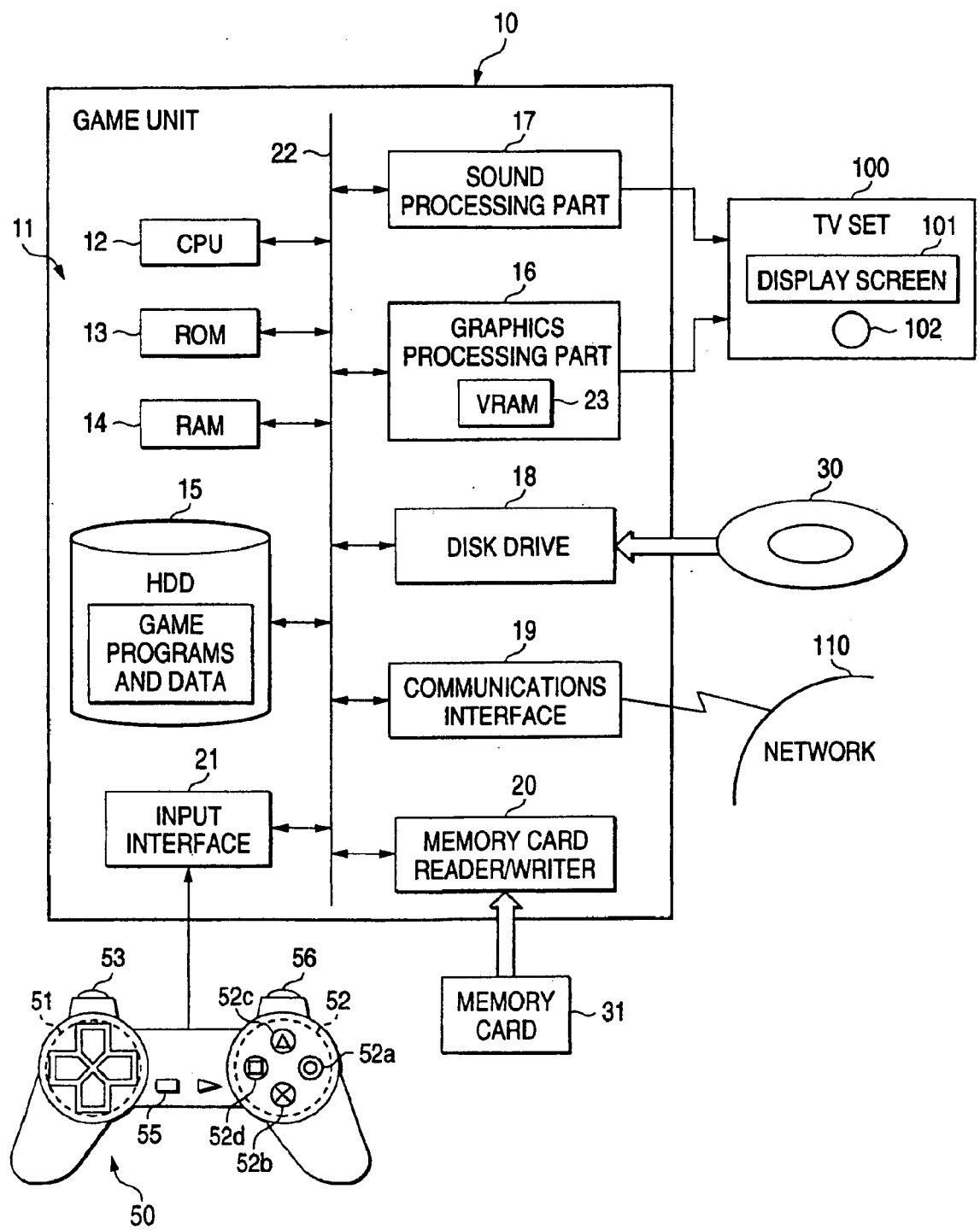
FIG. 1 is a block diagram showing an exemplary overall construction of a preferred embodiment of the invention.

A preferred embodiment of the invention will now be described with reference to the accompanying drawings. FIG. 1 is a block diagram showing the overall construction of this preferred embodiment.

First, a video game machine pertaining to this preferred embodiment of the invention is described. This game machine 10 is made up of a game unit proper 11 and a keypad 50 connected to an input side of the game unit proper 11, and a television set 100 having a CRT (Cathode Ray Tube) and speakers are connected to an output side of the game unit proper 11.

The game unit proper 11 has a CPU (Central Processing Unit) 12, a ROM (Read Only Memory) 13, a RAM (Random Access Memory) 14, a hard disc drive 15, a graphics processing part 16, an audio processing part 17, a disk drive 18, a communications interface 19, a memory card reader/writer 20 and an input interface 21, and a bus 22 connecting these elements. The game unit proper 11 is connected via the input interface 21 to the keypad 50, which serves as a control input part.

A +-key 51 and a group of buttons 52 are provided on the top of the keypad 50. The button group 52 includes a O-button 52a, a x-button 52b, a Δ-button 52c and a □-button 52d. A select button 55 is provided on a connecting part linking a base part on which the +-key 51 is provided to a base part on which the button group 52 is provided. Other buttons, such as an R1-button 56 and an L1-button 53, are provided on the side of the keypad 50.

The keypad 50 has switches linked respectively to the +-key 51, the O-button 52a, the x-button 52b, the Δ-button 52c, the □-button 52d, the select button 55, the R1-button 56 and the L1-button 53, and when a pushing force is applied to one of the buttons the corresponding switch turns on. A detection signal corresponding to this on/off state of the switch is generated in the keypad 50.

The detection signals generated in the keypad 50 are supplied to the input interface 21, and by a detection signal from the keypad 50 being passed through the input interface 21 it becomes detection information indicating which button on the keypad 50 has been turned on. In this way, control operation commands keyed in to the keypad 50 by a user are supplied to the game unit proper 11.

The CPU 12 centrally controls the apparatus as a whole by executing an operating system stored in the ROM 13, and executes video game programs stored in a program area of the RAM 14. Also, the CPU 12 monitors the state of the keypad 50 by way of the input interface 21, executes video game programs stored in the program area of the RAM 14 as necessary, and as necessary stores in a predetermined area of the RAM 14 various data derived in the course of a game. The ROM 13 includes EEPROM (Electrically Erasable and Programmable Read Only Memory), and predetermined data in the RAM 14 which must be held even when the power supply is cut are stored in the EEPROM at a stage before power supply cut-off.

The RAM 14 has mainly a program area, a picture data area, and an audio data area, and also has an area for holding other data. Program data, picture data, audio data and other data read from a disc 30 such as a DVD or a CD-ROM by the disk drive 18 are respectively held in these areas.

The RAM 14 is also used as a work area, and various data derived in the course of the game are further held in the area for holding other data. Program data, picture data, audio data and other data read from the disc 30 can also be held in the hard disc drive 15; program data, picture data, audio data and other data held in the hard disc drive 15 may be transferred to the RAM 14 as necessary; and various data derived in the course of the game and held in the RAM 14 may be transferred to and held in the hard disc drive 15.

The graphics processing part 16 includes in a VRAM 23 a frame buffer which constitutes a buffer memory for holding picture data; using control information from the CPU 12 arising along with program execution it generates a video signal on the basis of picture data held in the frame buffer and outputs the video signal to the television set 100. As a result, a picture based on picture data held in the frame buffer is displayed on the display screen 101 of the television set 100.

The audio processing part 17 has the function of generating audio signals such as BGM (Background Music), conversations between characters, and sound effects. The audio processing part 17 outputs to a speaker 102 of the television set 100 a sound signal including audio signals on the basis of data stored in the RAM 14 using control information from the CPU 12 arising along with program execution.

The television set 100 has the display screen 101 and the speaker 102 and performs picture (image) and audio output according to the content of the video game on the basis of the video signal (picture signal) and sound signal from the game unit proper 11.

The disk drive 18 is so constructed that a disc (DVD or CD-ROM) 30, which is a recording medium, can be removably loaded into it, and reads video game program data, picture data, audio data and other data held on the disc 30.

The communications interface 19 is connected to a network 110, and acquires various kinds of data by performing data communications with data storage devices and information processing devices such as servers installed in other locations. The video game program data, picture data, audio data and other data held in the RAM 14 may alternatively be acquired by way of the network 110 and the communications interface 19.

The memory card reader/writer 20 is so constructed that a memory card 31 can be removably loaded into it, and writes save data of a relatively low volume, such as mid-way progress data of video games and video game environment setting data, to a memory card.

On a recording medium pertaining to this preferred embodiment of the invention, that is, the disc 30, is recorded a video game program capable of displaying multiple characters including player characters and enemy characters on a screen and controlling actions of the displayed characters in accordance with control operations of a player, and this can be read by a computer (the CPU 12 and its peripheral devices). This computer can execute accepting first input of an action to be performed by a predetermined character in accordance with control operations of a player; accepting second input of a candidate character intended to be the object of an action to be performed by the predetermined character in accordance with control operations of the player; and a displaying of the vicinity of the candidate character differently depending on whether the candidate character is an enemy character or is other than an enemy character, in accordance with the type of the action accepted as the first input and the type of the candidate character accepted as the second input, and this computer also can execute displaying of the vicinity of the predetermined character and the vicinity of the candidate character differently.

Accordingly, the game unit proper 11 has, besides the functions necessary for carrying out a related art video game by software processing based on data held in the CPU 12 and the various memories, as special functions, a first function of accepting the input of an action to be performed by a predetermined character in accordance with control operations of a player; a second function of accepting the input of a candidate character intended to be the object of the action to be performed by the predetermined character in accordance with control operations of the player; and a function of, in accordance with the type of the action accepted as input by the first function and the type of the candidate character accepted as input by the second function, displaying the vicinity of the candidate character differently depending on whether the candidate character is an enemy character or is other than an enemy character. The game unit proper 11 also has a function of displaying the vicinity of the predetermined character and the vicinity of the candidate character differently.

As a result it is possible to realize a video game with which a character to be the object of an action of a player character can be made out easily and a player character can be made to execute an intended action exactly. Instead of being realized by software processing, these functions may alternatively be realized by the provision of appropriate dedicated hardware.

Figure 2:
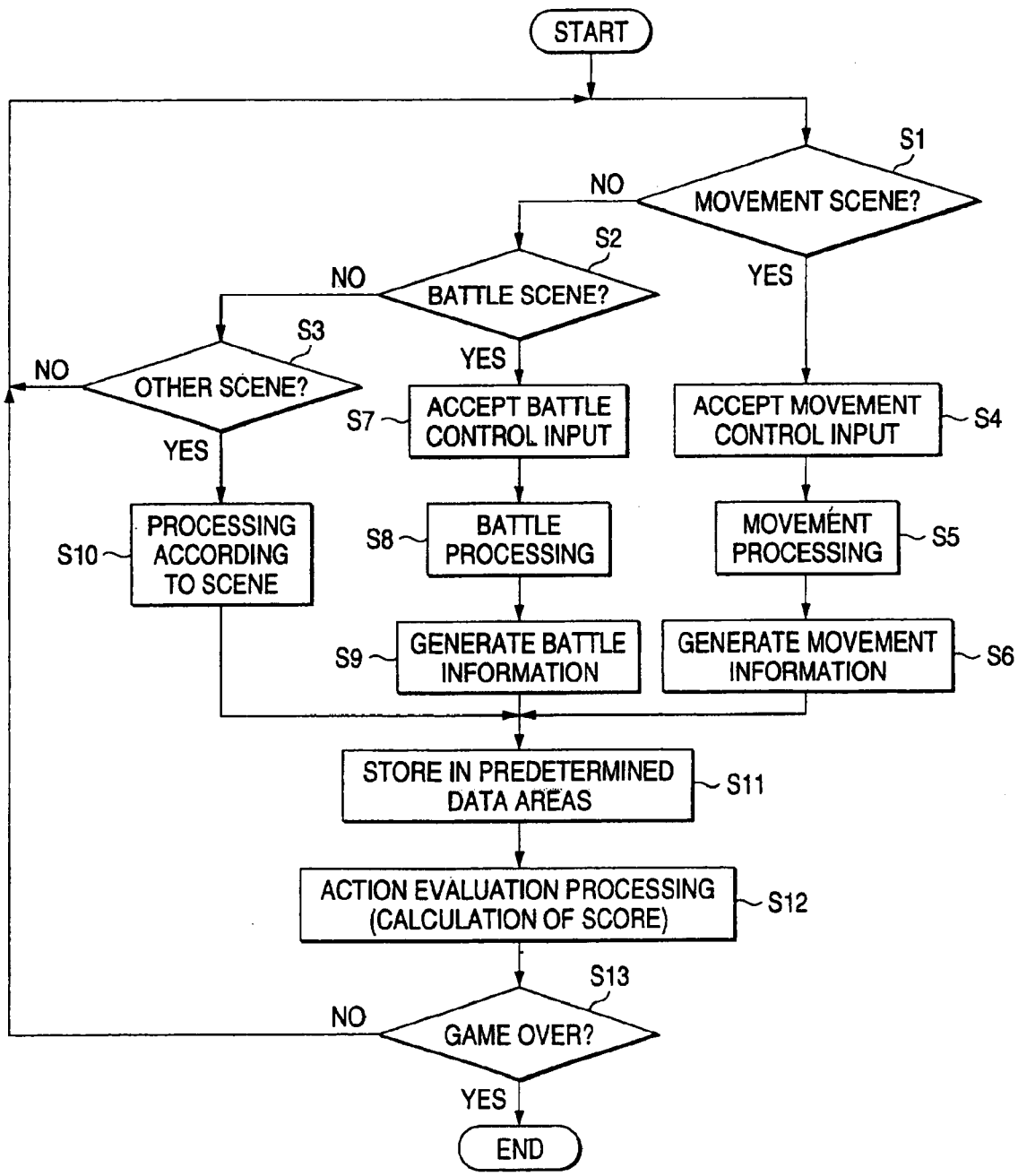
FIG. 2 is a flow chart used in an exemplary explanation of the overall operation of a preferred embodiment.

Next, the operation of this preferred embodiment will be explained. FIG. 2 is a flow chart showing an example of a processing routine of the overall operation of the preferred embodiment described above. The operations in FIG. 2 have been assigned the reference numerals S1 through S13.

First, when a power supply (not shown) is turned on, a boot program is read out; the different parts are initialized; and processing for starting a game is carried out. That is, by the disk drive 18, video game program data, picture data, audio data and other data held in the disc (DVD, CD-ROM or the like) 30 are read out and stored in the RAM 14, and as necessary data held in nonvolatile memory such as the EEPROM of the ROM 13, the hard disc drive 15, or the memory card 31 are read out and stored in the RAM 14. Before the start of an actual game, various settings are carried out to reach a state from which a game can proceed. Then, when a game is started from this state, a scene such as a movement scene, a battle scene or some other scene is set, and processing proceeds to step S1.

In step S1 it is determined whether or not the present scene is a movement scene, and if it is not a movement scene processing proceeds to step S2 and determines whether or not it is a battle scene. When in step S2 it is determined that the scene is not a battle scene, processing moves on to step S3 and it is determined whether or not the scene is another scene (conversation, shopping or picking up). When in step S3 it is determined that the scene is not another scene, processing returns to step S1 and the processing of steps S1 through S3 is repeated so that a standby state is assumed.

When in this state it is determined in step S1 that the present scene is a movement scene, processing moves on to step S4 and a movement control input-accepting state is assumed. And in step S5, movement processing corresponding to an accepted movement control input is carried out. When the movement processing ends, processing moves on to step S6 and movement information is generated on the basis of player character position information derived successively along with the movement processing. The movement information includes information showing a set zone in a virtual space in which the present player character is positioned. When the movement information has been generated, processing moves on to step S11.

When in step S2 it is determined that the present scene is a battle scene, processing moves on to step S7 and a battle control input-accepting state is assumed. Then, in step S8, battle processing corresponding to battle control operations accepted as input is carried out; a battle is fought between multiple player characters and multiple enemy characters in a combination freely selected by the player; and processing proceeds to step S9. In step S9, battle information is generated which shows, for example, names of the player characters and enemy characters which fought; the progress of the battle; the result of the battle; and parameters stipulating the capabilities of the player characters. When the battle information has been generated, processing moves on to step S11.

When in step S3 it is determined that the present scene is some other scene (conversation, shopping or picking up or the like), the routine proceeds to step S10 and processing according to the scene is carried out, other information corresponding to that processing is generated, and the routine proceeds to step S11.

When processing reaches step S11, the present position of the player character is successively updated by movement information being stored in a predetermined data area of the RAM 14. Additionally, battle zone information for each set zone and other information are stored in a predetermined data area of the RAM 14. That is, an action history of the player character is stored for each set zone.

Then, in step S12, action evaluation processing is carried out on the basis of the information showing the action history of the player character stored in the RAM 14. Specifically, for information where numbering is necessary, numbering is carried out using a pre-prepared conversion table; for information of which weighting is necessary, predetermined coefficients are applied; and these figures are totalled to calculate a score. The calculated score is added to a previous score held in a predetermined data area of the RAM 14, and by this being stored again in a predetermined data area of the RAM 14 a score constituting evaluation information is successively updated.

When action evaluation processing ends, processing moves on to step S13 and determines whether or not the game is over. When the game is not over, processing returns to step S1 and the processing of step S1 through step S3 described above is repeated.

When in step S13 it is determined that the game is over, although this is not shown in FIG. 2, the information showing the action history of characters, the evaluation information, and the player character capability settings information held in a predetermined area of the RAM 14 are each read from the RAM 14 and transferred to and stored together with other data in rewritable nonvolatile memory such as the EEPROM of the ROM 13, the hard disc drive 15, or the memory card 31. After other kinds of processing accompanying the ending of a game are carried out, the power supply is cut off and the game ends. When the power supply is switched on again, the various information and other data thus held in nonvolatile memory by data save processing before power supply cut-off are read out from the nonvolatile memory to which they were saved and stored again in the same data area of the RAM 14 in which they were held before the power supply was cut off.

Figure 3:
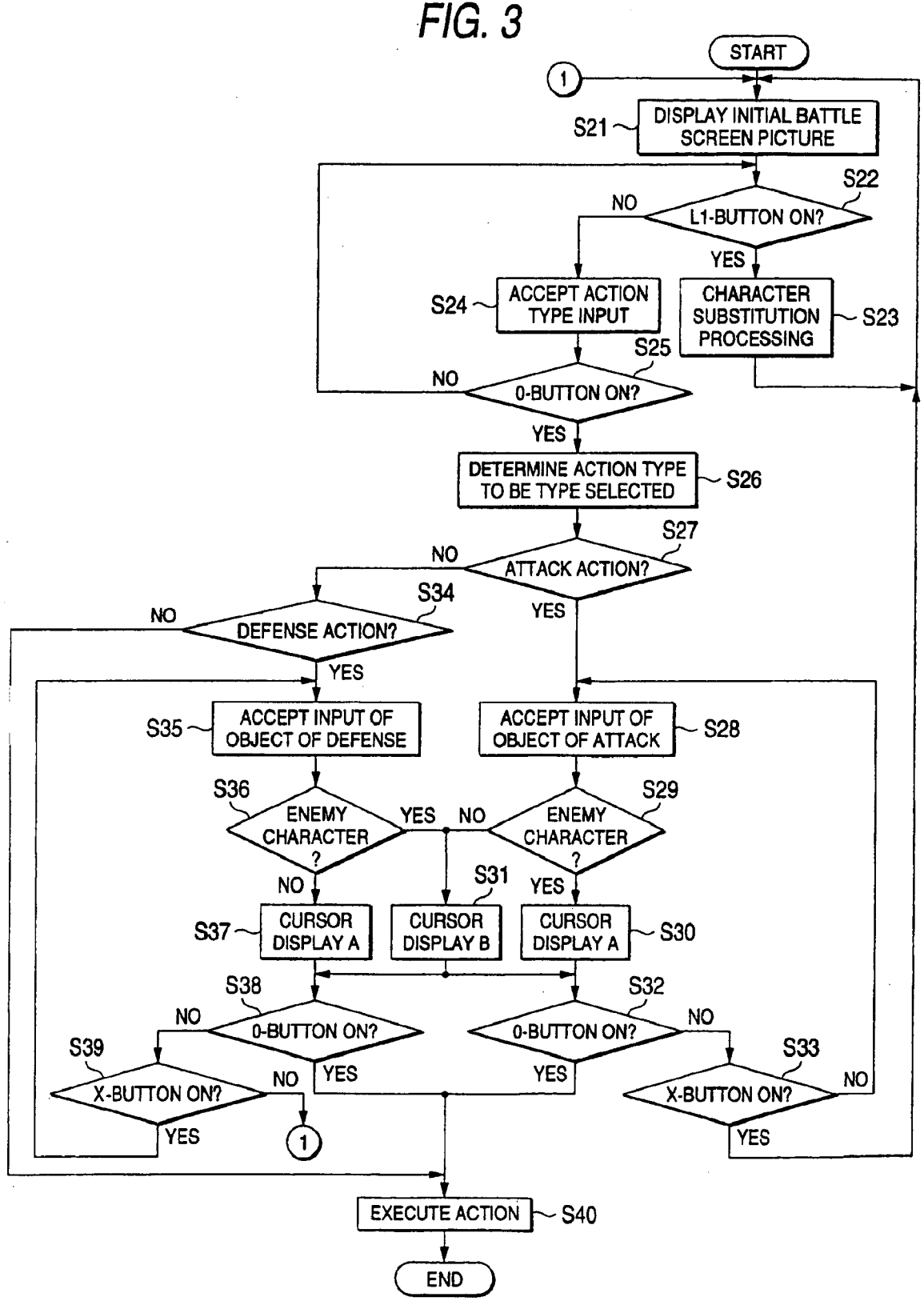
FIG. 3 is a flow chart used in an exemplary explanation of battle control input-acceptance processing in a preferred embodiment.
Figure 4A:
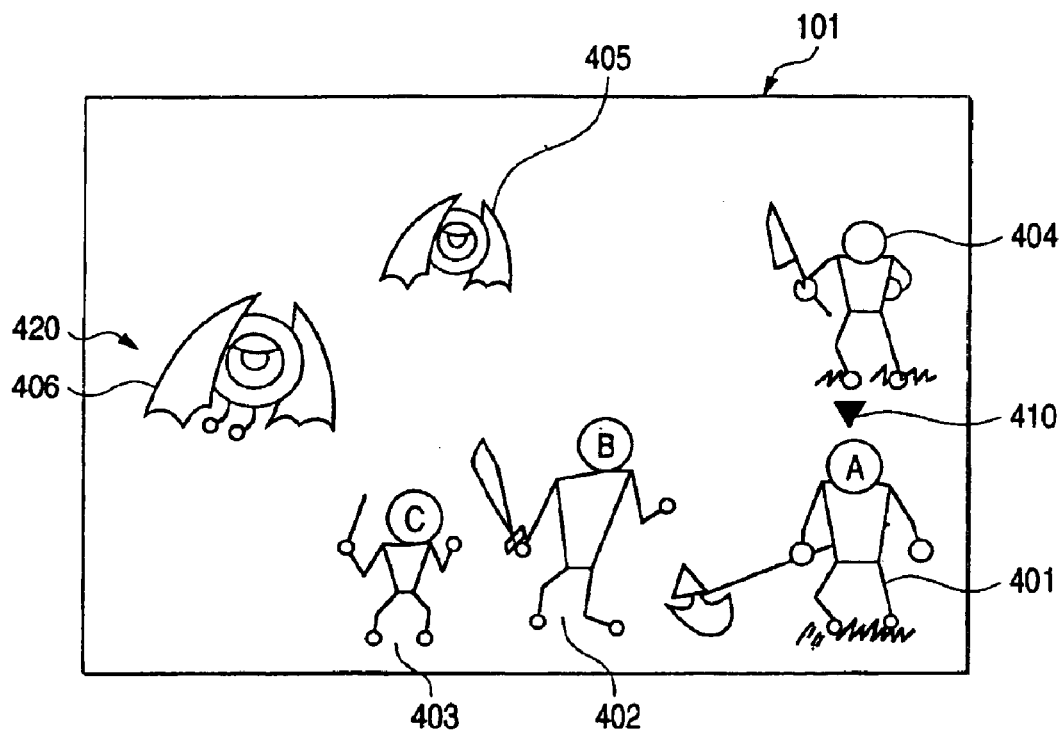
FIG. 4A is a view illustrating an example of a display picture in a preferred embodiment.
Figure 4B:
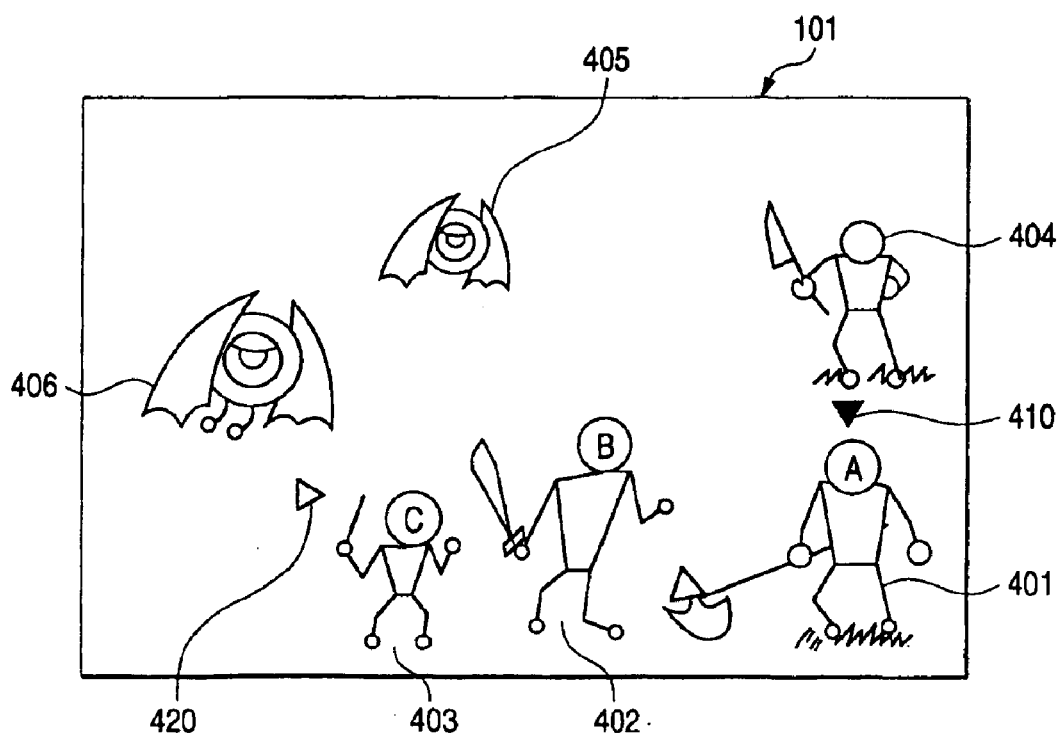
FIG. 4B is another view illustrating an example of a display picture in a preferred embodiment.

FIG. 3 is a flow chart showing an example of a processing procedure for the battle control operation input-acceptance processing (step S7) of the preferred embodiment described above, and FIGS. 4A and 4B show an example of a specific display picture pertaining to battle control operation input-acceptance. With reference to FIG. 3 and FIGS. 4A and 4B, battle control operation input-acceptance processing in the preferred embodiment described above is now explained. The steps in FIG. 3 have been assigned the reference numerals S21 through S40. In FIG. 4A and FIG. 4B the reference numbers 401 through 403 denote player characters taking part in a battle and the reference numbers 404 through 406 denote enemy characters, and it will be assumed that a battle can be fought with any combination of these characters.

First, when the battle control operation input-acceptance processing is reached in the routine of FIG. 2, in step S21, an initial battle picture is displayed, as shown in FIG. 4A. In this initial battle picture, player characters 401 through 403 and enemy characters 404 through 406 are displayed confronting each other. In FIG. 4A, the reference number 410 denotes a marker indicating a character which is to be the object of input-accepting of an action (command input) or character replacement, and this marker points to a certain character decided upon by internal processing. In FIG. 4A, the reference number 420 denotes a cursor for pointing to a candidate character intended to be the object of an action. However, this cursor is not displayed at this stage.

In step S22 it is determined whether or not the L1-button 53 has been pressed, and when it is determined that the L1-button 53 has been pressed processing proceeds to step S23. When processing proceeds to step S23, a state is assumed wherein the character indicated by the marker 410 can be replaced with a substitute character. That is, a substitute character is selected by a control operation of the player, and character substitution processing is carried out as necessary between the selected substitute character and the character indicated by the marker 410. When the character substitution processing ends, processing returns to step S21 and the initial battle picture is displayed. And also when character substitution is canceled part-way through, processing returns to step S21 and the initial battle picture is displayed.

When in step S22 it is determined that the L1-button 53 has not been pressed, processing moves on to step S24. A state for accepting the input of an action (command input) to be executed by the character pointed to by the marker 410 is assumed and an action is selected in accordance with an operation of the +-key 51. In FIG. 4A, a display region for action selection is omitted. Then, in step S25, it is determined whether or not the O-button 52a has been pressed. When it is determined that the O-button 52a has not been pressed, processing returns to step S22. The processing of step S22, step S24 and step S25 is also repeated so that a standby state is assumed until either the L1-button 53 is pressed or the O-button 52a is pressed.

When in step S25 it is determined that the O-button 52a has been pressed, processing moves on to step S26, selection of the action selected at that time is confirmed, various associated processing is carried out, and the displayed picture changes to a battle execution picture. At this time, the cursor 420 of FIG. 4A is displayed for the first time, and a candidate character intended to be the object of an action determined by internal processing is indicated. As shown in FIG. 4A, the marker 410 and the cursor 420 are displayed differently. When the various processing associated with action determination ends and the displayed picture changes to a battle execution picture, processing moves on to step S27 and it is determined whether or not the action of which selection has been confirmed is an attack action. When it is determined that the action selected is an attack action, processing moves on to step S28.

When processing reaches step S28, a state for accepting the input of a candidate character intended to be the object of the attack action of the character indicated by the marker 410 is assumed, and a candidate character is selected in accordance with a number of times the +-key 51 is pressed. Then, in step S29, it is determined whether or not the selected character is an enemy character. When it is determined that the selected character is an enemy character, processing moves on to step S30; the display color of the cursor 420 is set to A; the selected candidate character is indicated by the cursor 420; and processing proceeds to step S32.

When, on the other hand, in step S29 it is determined that the selected character is not an enemy character, processing moves on to step S31; the display color of the cursor 420 is set to B; the selected candidate character is indicated by the cursor 420; and processing proceeds to step S32.

In step S32 it is determined whether or not the O-button 52a has been pressed, and when it is determined that the O-button 52a has not been pressed processing proceeds to step S33 and it is determined whether or not the x-button 52b has been pressed. When it is determined that the x-button 52b has not been pressed, processing returns to step S28 and the processing of step S28 through step S33 is repeated so that a standby state wherein candidate character selection input is accepted is assumed until either the O-button 52a is pressed or the x-button 52b is pressed.

That is, each time the +-key 51 is pressed once the cursor 420 moves from one displayed character to the next to indicate a selected candidate character. When the candidate character is an enemy character the cursor 420 is displayed with the color A and when the candidate character is not an enemy character the cursor 420 is displayed with the color B.

For example, it will be assumed that an attack action has been selected and this selection confirmed and a battle execution picture is displayed as shown in FIG. 4A, and that first the enemy character 406 is indicated by the cursor 420 in the display color A. Also, it will be assumed that each time the +-key 51 is pressed once the cursor 420 moves from character to character in the order of 406→405→404→403→402→401→406.

In this case, among the enemy characters 404 through 406, the cursor 420 moves between and points to the characters while still displayed in the color A. And among the player characters 401 through 403, the cursor 420 moves between and points to the characters while being displayed in the color B, as shown in FIG. 4B. FIG. 4B shows a state wherein the player (supporter) character 403 is selected as the object of an attack and the cursor 420 is shown in the vicinity of the character 403 in the display color B.

When in step S32 it is determined that the O-button 52*a* has been pressed, processing moves on to step S40 and the selected attack action is executed and this sequence of battle control operation input-acceptance processing ends. When in step S32 it is determined that the x-button 52*b* has been pressed, processing returns to step S21 and the initial battle picture in which the cursor 420 does not appear is displayed.

When in step S27 it is determined that the selected action is not an attack action, processing moves on to step S34 and it is determined whether or not the selected action is a defense action. When it is determined that the selected action is a defense action, processing moves on to step S35. When processing reaches step S35, a state for accepting the input of a candidate character intended to be the object of the defense action of the character indicated by the marker 410 is assumed, and a candidate character is selected in accordance with a number of times the +-key 51 is pressed. Then, in step S36, it is determined whether or not the selected candidate character is an enemy character. When it is determined that the selected character is an enemy character, processing moves on to step S31; the display color of the cursor 420 is set to B; the selected candidate character is indicated by the cursor 420; and processing proceeds to step S38.

When, on the other hand, in step S36 it is determined that the selected character is not an enemy character, processing moves on to step S37; the display color of the cursor 420 is set to A; the selected candidate character is indicated by the cursor 420; and processing proceeds to step S38.

In step S38, it is determined whether or not the O-button 52*a* has been pressed. When it is determined that the O-button 52*a* has not been pressed processing proceeds to step S39 and it is determined whether or not the x-button 52*b* has been pressed. When it is determined that the x-button 52*b* has not been pressed, processing returns to step S35 and the processing of step S35 through step S39 is repeated so that a standby state wherein candidate character selection input is accepted is assumed until either the O-button 52*a* is pressed or the x-button 52*b* is pressed.

Each time the +-key 51 is pressed once, the cursor 420 moves in a predetermined order between the displayed characters and points to a selected candidate character. When the candidate character is an enemy character, reversely from when the action is an attack action, the cursor 420 is displayed in the color B, and when the candidate character is not an enemy character the cursor 420 is displayed in the color A.

When in step S38 it is determined that the O-button 52*a* has been pressed, processing moves on to step S40 and the selected attack action is executed and this sequence of battle control operation input-acceptance processing ends. When in step S32 it is determined that the x-button 52*b* has been pressed, processing returns to step S21 and an initial battle picture in which the cursor 420 does not appear is displayed. When in step S34 the selected action is not a defense action, processing moves on directly to step S40 and an action which is neither an attack action nor a defense action is executed and this sequence of battle control operation input-acceptance processing ends.

Thus the preferred embodiment described above provides the following effects. A first effect is that because the vicinity of a candidate character is displayed differently depending on the type of the action of the player character and the type of the candidate character intended to be the object of the action of the player character, the player can easily make out the candidate character and the enjoyability of the game can be maintained. A second effect is that because the function for distinguishing the candidate character is added to a cursor necessary for character selection, and attack action control operations and defense action control operations can be carried out exactly with the help of the display form of the cursor, the enjoyability of the game can be maintained. A third effect is that because the vicinity of a predetermined character to perform an action can be displayed differently from the vicinity of a candidate character intended to be the object of the action, the relationships between multiple characters in the picture can be understood more exactly and the enjoyability of the game can be maintained.

Next, other preferred embodiments are described. In the preferred embodiment described above, in the battle control input-acceptance processing, a case wherein control commands relating to battle control operations are accepted using the L1-button 53, the +-key 51, the O-button 52*a* and the x-button 52*b* was described; however, other buttons may alternatively be used. And whereas a case was described in which only the timing at which a switch is turned on after its respective button is pressed is monitored in the input-accepting of operation commands, alternatively operation commands may be accepted using the timing at which the switch linked to the respective button is turned off, or both the on and the off timing of the switch linked to a respective button can be monitored and both combined to input-accept operation commands. Also, the time for which a switch linked to a respective button is on or off can be combined to input-accept operation commands.

In the preferred embodiment described above a case was described wherein display is effected so that it is possible to distinguish between a case wherein a candidate character is an enemy character and a case wherein the candidate character is not an enemy character by making the display color of a cursor different. Alternatively the vicinity of the candidate character other than the cursor may alternatively be made different. Instead of the distinction made with the color of the cursor, alternatively, its shape can be made different or it may be made to flash or to undergo some other periodic change.

In the preferred embodiment described above, a case was also explained wherein display colors A and B were used for a cursor and the relationship of the display color of the cursor was made opposite in the case of an action being an attack action from the case of it being a defense action. Alternatively, the relationship of the display color of the cursor may be made the same in the case of an attack action as it is in the case of a defense action. Simply one display color may be used when the candidate character is an enemy character and the other display color used when the candidate character is not an enemy character, irrespective of the action. Or, display colors A, B, C and D may be provided and display colors mutually different in each case may be used. That is, it is only necessary that the display form be made different depending on whether the candidate character is or is not an enemy character so that the difference can be distinguished, and there is no limitation on the display colors used.

The present invention is not limited to the preferred embodiments described above, and it will be clear that various changes and modifications are possible within the spirit and scope of the invention. For example, the order of the steps of a method according to the invention can be changed within the spirit and scope of the invention.

As described above, with the present invention it is possible to understand easily which character is to be the object of an action of a player character, and it is possible to make a player character execute an intended action exactly.

What is claimed is:

1. A computer-readable recording medium on which is recorded a video game program capable of displaying multiple characters including a player character and an enemy character on a screen and controlling actions of the displayed characters in accordance with control operations of a player, which program comprises:

accepting input to a computer of an attack action or a defense action to be performed by a predetermined character in accordance with a control operation of the player;

accepting input to the computer of a candidate character intended to be an object of the attack action or the defense action to be performed by the predetermined character in accordance with a control operation of the player;

displaying, when the input action is the attack action and the candidate character is the enemy character, a cursor pointing at the candidate character in a first color, and when the input action is the attack action and the candidate character is not the enemy character, the cursor pointing at the candidate character in a second color; and displaying when the input action is the defense action and the candidate character is not the enemy character, a cursor pointing at the candidate character in a third color, and when the input action is the defense action and the candidate character is the enemy character, the cursor pointing at the candidate character in a fourth color.

2. The computer-readable recording medium according to claim 1, on which is recorded a program for displaying a vicinity of a predetermined character to perform an action differently from a vicinity of a candidate character intended to be an object of the action.

3. The medium of claim 1, in which the second color is the same as the third color and the first color is the same as the fourth color.

4. The medium of claim 1, in which a vicinity of the candidate character other than the cursor changes colors.

5. A video game processing method of a video game capable of displaying multiple characters including a player character and an enemy character on a screen and controlling actions of the displayed characters in accordance with control operations of a player, the method comprising:

accepting a first input to a computer of an action to be performed by a predetermined character in accordance with a control operation of the player;

accepting a second input to the computer of a candidate character intended to be an object of the action to be performed by the predetermined character in accordance with a control operation of the player;

displaying, when the input action is an attack action and the candidate character is the enemy character, a cursor pointing at the candidate character in a first color, and when the input action is the attack action and the candidate character is not the enemy character, the cursor pointing at the candidate character in a second color; and displaying when the input action is a defense action and the candidate character is not the enemy character, a cursor pointing at the candidate character in a third color, and when the input action is the defense action and the candidate character is the enemy character, the cursor pointing at the candidate character in a fourth color.

6. The video game processing method according to claim 5, further comprising a displaying of a vicinity of a predetermined character to perform an action differently from a vicinity of a candidate character intended to be an object of the action.

7. The method of claim 5, in which the second color is the same as the third color and the first color is the same as the fourth color.

8. The method of claim 5, in which a vicinity of the candidate character other than the cursor changes colors.

9. A video game apparatus, comprising:

a storage system that stores a video game program capable of displaying multiple characters including a player character and an enemy character on a screen and controlling actions of the displayed characters in accordance with control operations of a player;

a computer for reading from the storage system and executing the program; and a display apparatus for picture display, provided as an output system of the computer, wherein the computer, by executing the program, accepts the input of an action to be performed by a player character in accordance with a control operation of the player; accepts the input of a candidate character intended to be an object of the action to be performed by the predetermined character;

when the input action is an attack action and the candidate character is the enemy character, a cursor pointing at the candidate character in a first color, and when the input action is the attack action and the candidate character is not the enemy character, the cursor pointing at the candidate character in a second color; and displays when the input action is a defense action and the candidate character is not the enemy character, a cursor pointing at the candidate character in a third color, and when the input action is the defense action and the candidate character is the enemy character, the cursor pointing at the candidate character in a fourth color.

10. The video game apparatus according claim 9, wherein the computer displays a vicinity of a predetermined character to perform an action differently from a vicinity of a candidate character intended to be an object of the action.

11. The apparatus of claim 9, in which the second color is the same as the third color and the first color is the same as the fourth color.

12. The apparatus of claim 9, in which a vicinity of the candidate character other than the cursor changes colors.

* * * * *